July 7, 1931.  A. B. CHANCE  1,813,482
POLE GUY FIXTURE
Filed July 11, 1930  3 Sheets-Sheet 1

Inventor
Albert B. Chance
By Williams, Bradbury,
McCaleb & Hinkle
Attys.

July 7, 1931.  A. B. CHANCE  1,813,482
POLE GUY FIXTURE
Filed July 11, 1930  3 Sheets-Sheet 2

Inventor
Albert B. Chance
By Williams, Bradbury,
McCaleb, Hinkle
Attys.

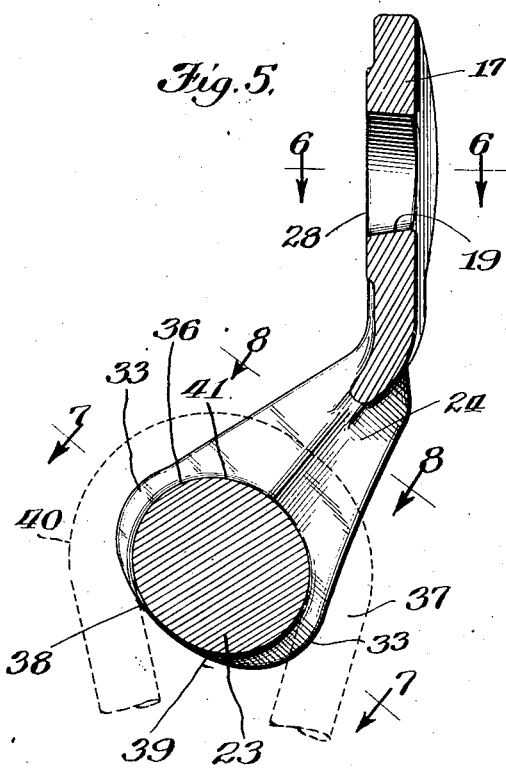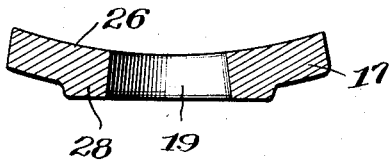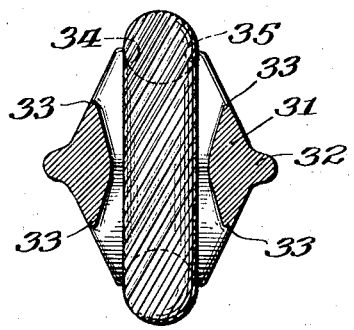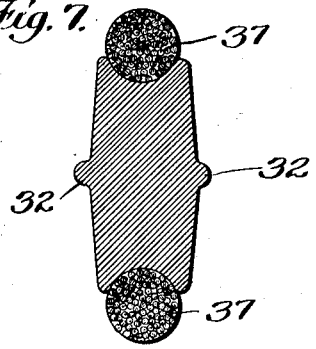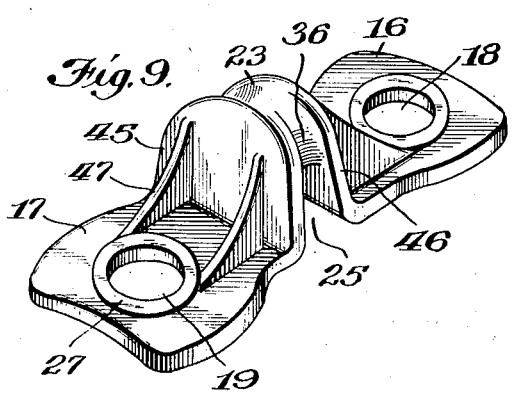

Patented July 7, 1931

1,813,482

UNITED STATES PATENT OFFICE

ALBERT B. CHANCE, OF CENTRALIA, MISSOURI

POLE GUY FIXTURE

Application filed July 11, 1930. Serial No. 467,246.

The present invention relates to pole guy fixtures, and is particularly concerned with improved types of fixtures for securing guy cables to poles or other members to which guys are to be attached.

The present application is a continuation in part of my prior United States application, Serial No. 272,901, filed April 26, 1928, for pole guy fixtures.

One of the objects of the present invention is the provision of a plurality of improved types of pole guy fixtures, which are adapted to be used for securing guys of all kinds, such as messengers, head guys, back guys, etc., to poles or the like.

Another object is the provision of improved pole guy fixtures which are adapted to prevent the unequal strain on the parts of a cable at the fixture, thereby increasing the strength and efficiency of the complete assembly and enabling the more efficient utilization of the cable.

Another object is the provision of improved pole guy fixtures which are adapted to prevent excessively sharp curves in the cable at the fixture, and consequently to prevent the undesirable strains which are induced by sharp bends in the cable.

Another object is the provision of improved pole guy fixtures which are adapted to prevent the flattening of the cable under lateral pressure on the cable at the fixture, thereby tending to equalize the strains in the parts of the cable at the fixture.

Another object is the provision of improved pole guy fixtures which are adapted to be economically manufactured, which are stronger and more durable than the devices of the prior art, and which are capable of a wide variety of uses.

Another object is the provision of an improved pole guy fixture peculiarly adapted for the attachment of diagonally extending guys to poles or the like.

Another object is the provision of an improved pole guy fixture peculiarly adapted for the attachment of transverse guys to poles or the like.

Another object is the provision of improved pole guy fixtures adapted to be combined for use with diagonally and transversely extending guys and capable of being embodied in a single fixture for combinations of different types of guys.

Other objects and advantages of the invention will be apparent from the following description and from the accompanying drawings, in which similar characters of reference indicate similar parts throughout the several views.

Referring to the drawings, of which there are three sheets;

Fig. 5 is a sectional view taken on the plane of the line 5—5 of Fig. 4, looking in the direction of the arrows;

Fig. 6 is a sectional view taken on the plane of the line 6—6 of Fig. 5;

Fig. 7 is a sectional view taken on the plane of the line 7—7 of Fig. 5, looking in the direction of the arrows;

Fig. 8 is a sectional view taken on the plane of the line 8—8 of Fig. 5, looking in the direction of the arrows;

Fig. 9 is a view in perspective of another modified form of fixture peculiarly adapted to be utilized for attaching guys transversely to the pole.

Figure 1:
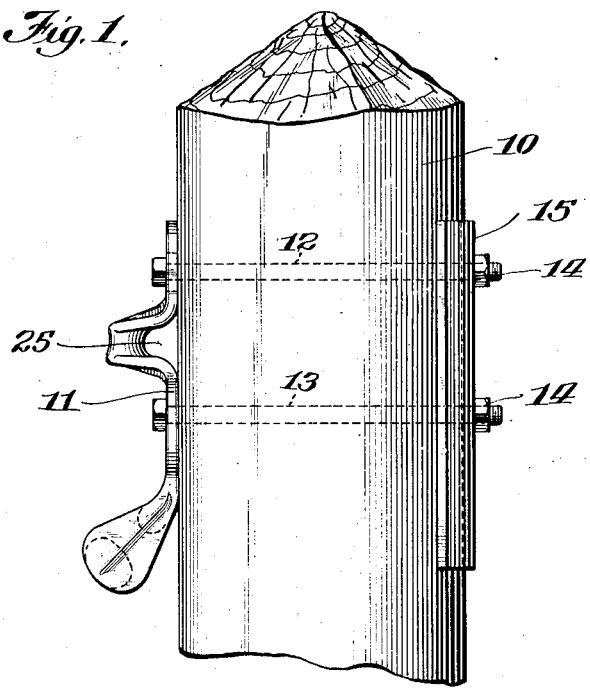
Fig. 1 is a side elevational view of the top of a pole upon which one of the combined guy fixtures has been installed.

Referring to Fig. 1, this is an exemplary installation of one of the pole guy fixtures upon a pole 10 such as an electric light, power, telephone or telegraph pole, and the fixture which is indicated in its entirety by the numeral 11 is preferably secured to the pole by means of one or more bolts 12, 13, having a drive fit through holes bored in the pole 10. The bolts 12, 13 may be provided with the usual nuts 14 and washers, or with a washer plate 15 comprising a sheet metal member curved complementarily to the surface of the pole 10 and provided with apertures for receiving the bolts 12 and 13.

Figure 2:
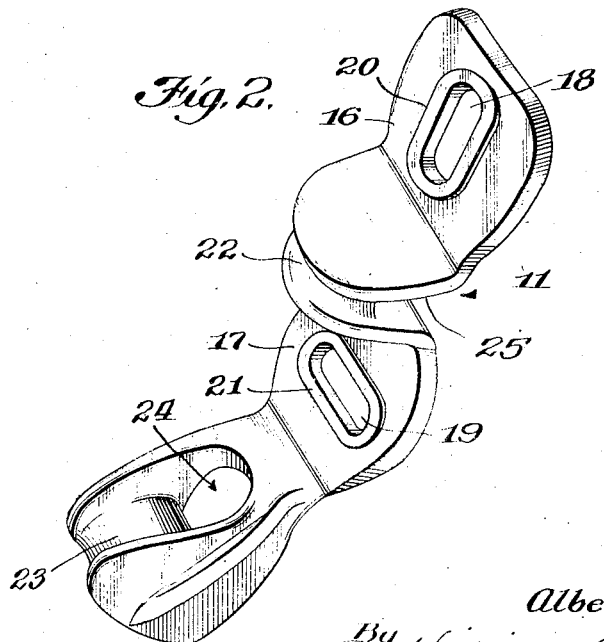
Fig. 2 is a view in perspective of the pole guy fixture illustrated at the left in Fig. 1.

The fixture 11 of Fig. 1 is illustrated in perspective in Fig. 2, and this fixture preferably includes one or more body portions 16, 17 adapted to be secured to the pole 10, and consequently is provided with apertures 18, 19.

The body portions 16, 17 serve as attaching flanges for receiving the bolts 12, 13 and if desired may be provided with ordinary round apertures, but the apertures illustrated in the preferred embodiment of Fig. 2 are elongated slots 18, 19 arranged with their longest dimensions transversely of each other.

In the boring of the substantially parallel holes through the pole 10 for the bolts 12 and 13, it is quite easy to begin the boring at an appropriate spacing at one side of the pole, but often difficult to assure the location of the other end of the bore so that it will register with the apertures in a fixture.

The slots 18 and 19 are adapted to permit a vertical adjustment or deviation of the location of the bolts 12 and 13 and the slot 19 is adapted to permit the adjustment of the fixture on the hole 13 in a lateral direction so that the apertures in the fixture of Fig. 2 may be made to register with the bolts without any difficulty.

It should be understood, however, that the feature of providing transversely extending slots need not be utilized in every embodiment of the invention and this feature is only advantageous where it is desired to utilize fixtures at both ends of the bolts 12 and 13.

The slots 18 and 19 are preferably provided with upwardly projecting collars surrounding the slots and formed with flat upper surfaces 20, 21 for engaging the bolt or nut, and the flanges or bodies 16 and 17 are preferably laterally curved as shown in Fig. 6, in order to provide a surface which is complementary to the exterior surfaces of the pole 10.

The body of the fixture 11 may be provided with one or more cable supporting yokes 22, 23 for the purpose of the attachment of the cable to the fixture and the cable supporting yokes may be in the form of a cable eye 24 or they may take the form of an open sided slot 25 adapted to confine the cable between the yoke 22 and the side of the pole. Both forms of cable attachment are exemplified in Fig. 2 in which the two cable supporting yokes 22 and 23 are provided but it will be observed that the fixture illustrated in Figs. 3 to 8 is substantially the same as the lower part of Fig. 2, while the fixture illustrated in Fig. 9 is similar to the upper part of Fig. 2.

Figure 3:
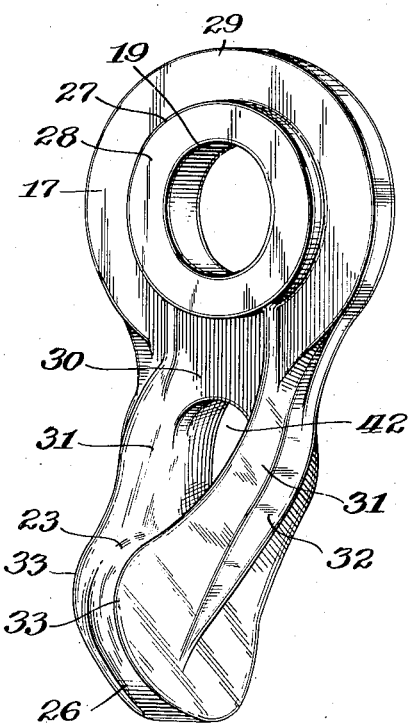
Fig. 3 is a view in perspective of a pole guy fixture peculiarly adapted to be utilized for diagonally extending guys.

In other words, Fig. 2 is an illustration of a combined fixture for transversely and diagonally extending guys but the fixtures of Figs. 3 and 9 may be combined by utilizing the lower bolt 13 for securing both the fixture of Fig. 3 and the lower end of the fixture of Fig. 9.

Since the lower part of the combined fixture of Fig. 2 is substantially the same as the fixture which is illustrated in detail in Figs. 3 to 8, the features of construction may be most conveniently described in reference to the latter figures.

Referring to Fig. 3, the supporting body 17 is preferably made circular in shape and provided with a concave rear surface 26 which is complementary to the curvature of the average pole. The attaching body 17 is preferably provided with a centrally located circular aperture 19 adapted to receive an attaching bolt 13 and the aperture 19 is preferably bounded by an annular collar 27 having a substantially flat outer surface 28 for engagement with the head, nut or washer of a securing bolt.

The curved rear surface 26 in combination with a single securing bolt effectively prevents the rotation of the fixture upon the securing bolt when it has been firmly secured to a pole and the annular collar 27 is adapted to give an increased area of bearing surface for the head of the bolt over the bearing surface which would be present if the bolt should engage the concavely curved upper surface 29 of the body 17.

The supporting body 17 is preferably provided with a diagonally projecting integral extension 30 extending in substantially the direction of the guy which is attached to the fixture and the extension 30 is preferably provided with a pair of arms 31, 32 which are joined by the yoke 23. The arms 31 which are illustrated in section in Fig. 8, preferably have their widest dimension extending in a direction substantially parallel to the direction of the loop of the cable, and the arms 31 are preferably provided with laterally projecting flanges 32 which extend from the arms 31 backward to the body 17, thereby giving the arms 31 a substantially diamond-shaped cross section which increases the strength of the fixture for resisting the peculiar strains to which such a fixture is subjected.

The arms 31 and 32 are gradually increased in depth from the body 17 to the yoke 23 where the arms form lateral flanges 33 projecting upward and downward from the yoke 23 and forming the side walls 34, 35 of a cable receiving groove 36. The upwardly and downwardly projecting flanges 33 also extend along the arms 31 to the body 17 and increase the strength of the fixture against downward bending forces as well as other strains to which the fixture is subjected.

The yoke 23 is illustrated in connection with a cable 37 in Fig. 5, and it will be observed that the groove 36 extends about the yoke 23 from approximately the point 38 to the point 39. The yoke 23 is substantially horseshoe-shaped in section, and the diameter of the yoke 23 is preferably greater than the diameter of the cable 37 so that an increased perimeter is provided on the yoke 23 for a larger bearing surface for the cable 37, and to prevent the cable from being bent into a relatively sharp loop.

In the preferred embodiment the yoke 23 is of such size that the cable bends about a member the diameter of which is one or more times the diameter of the cable, and the present fixture is thereby adapted to prevent the greatly increased strains at the outer part 40 of the cable where the strands are placed under greater tension than the strands located at the inner part 41 of the loop.

Figure 4:
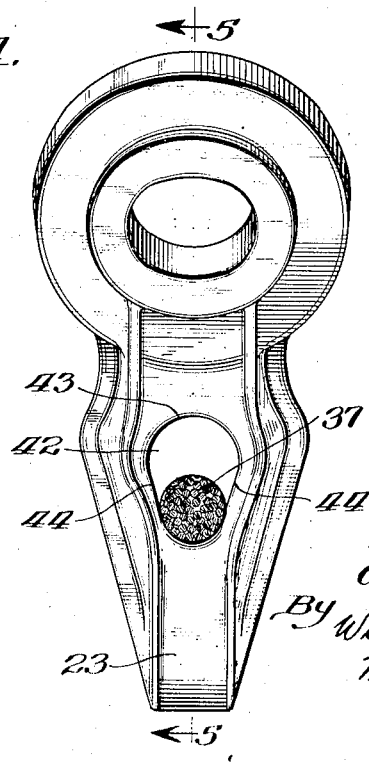
Fig. 4 is a front elevational view of the fixture of Fig. 3, with a cable shown in section passing through the eye of the fixture.

Arms 31, 32 and extension 32 of the body 17 form a cable eye 42 in the embodiment of Figs. 3 and 4, through which the cable 37 may be passed to loop the cable about the yoke 23, the end of the cable being secured by any convenient securing or clamping device.

The eye 42 is preferably largest at its upper end 43 to facilitate the convenient insertion of the cable and the enlarged opening 43 is particularly advantageous where the end of the cable is frayed or otherwise enlarged. The walls 44 of the eye 42 which are formed by the arms 31 preferably slope toward each other and toward the groove 23 to provide an eye opening 42 which tapers in width toward the groove 23.

The groove 23 is provided with a cable engaging surface which is preferably substantially complementary to the shape of the cable intended to be used with the fixture and consequently the groove 23 preferably has such a shape that its outline in section takes the shape of a portion of a circle as shown in Figs. 4, 7 and 8.

The groove may be tapered in depth from the point 38 about the yoke 23 to the point 39 and the side walls 34 and 35 of the complementary groove 23 are adapted to support the sides of the cable 37 preventing the flattening of the cable at least in some degree and tending to equalize the strains placed upon the cable by lateral engagement of the cable with the yoke 23.

The flattening of the cable causes unequal strains on the parts of the cable, and the prevention of flattening and support of the side walls of the cable tends to equalize the strains in the strands of the cable and thereby to prevent breaking of the cable at the fixture 17.

In the embodiment of Fig. 9 the body portion of the fixture includes a pair of attaching flanges 16, 17 each provided with a transversely extending flange or arm 45, 46 which arms are joined by the yoke 23. The yoke 23 of this embodiment is likewise provided with a groove 36 substantially circular in cross section and extending in substantially the shape of a horseshoe through the opening 25 between the arms 45 and 46. The arms 45 and 46 may be reinforced by ribs 47 and the attaching flanges 16, 17 are likewise provided with bolt openings 18 and 19 surrounded by annular collars 27 for engagement with the nut or head of the bolt.

The details of structure of the groove 36 and the yoke 23 may be substantially identical with that described for the fixture of Figs. 3 and 4, and the fixture of Fig. 2 is substantially the same as the combination of the fixtures of Figs. 3 and 9 in one integral fixture.

The installation and operation of the foregoing fixtures will be evident from the preceding description. The fixture is attached to the pole by means of bolts or other securing devices as shown in Fig. 1, and the cable applied to the yoke 23 through the opening 25 or the eye 42. The cable may be secured in any convenient manner in the form of a loop as shown in Fig. 5, and the form of the yoke 23 with the cable engaging surface of the groove 36 will prevent any sharp bends in the cable and prevent the flattening of the cable so as to greatly increase the strength of the cable at the fixture over the devices of the prior art, by tending to equalize the strains in the various strands of the cable.

The present fixtures are capable of a wide variety of different uses for attaching guys of many different kinds.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my inventon, what I claim is new and desire to secure by Letters Patent of the United States is:

1. A pole guy fixture comprising a supporting body adapted to be attached to a pole or the like, and an integral extension of said body having a cable engaging surface which is curved laterally to conform substantially to the size and shape of said cable whereby the lateral walls of said extension support said cable laterally thereof to prevent flattening of the cable at the fixture, said body being provided with walls forming an opening tapering in width toward said cable engaging surface to facilitate the location of a cable on said surface under lateral pressure.

2. A pole guy fixture comprising a pair of substantially parallel body portions, and a cable supporting yoke joining said parallel body portions, said yoke having a groove for receiving and supporting a cable against flattening and said groove extending in substantially the form of a horse-shoe to prevent sharp bends in said cable at said fixture.

3. A pole guy fixture for diagonally extending guys comprising a body having an integral attaching flange with a bolt aperture, a diagonally extending body portion formed with a cable eye, said eye being of a larger size than said cable and tapering in width toward a cable engaging surface complementary in shape to said cable.

4. A pole guy fixture for diagonally extending guys comprising a body having an integral attaching flange with a bolt aperture, a diagonally extending body portion formed with a cable eye, said eye being of a larger size than said cable and tapering in width toward a cable engaging surface complementary in shape to said cable, and said cable engaging surface comprising a groove extending about a yoke of substantially greater diameter than the said cable.

5. A pole guy fixture for diagonally extending guys comprising a body having an integral attaching flange with a bolt aperture, a diagonally extending body portion formed with a cable eye, said eye being of a larger size than said cable and tapering in width toward a cable engaging surface complementary in shape to said cable, said cable engaging surface comprising a groove extending about a yoke of substantially greater diameter than the said cable, and said body portion being curved to engage a curved pole surface to prevent rotation on a securing bolt.

6. A pole guy fixture comprising a body having an integral yoke with a grooved cable engaging surface, said yoke being joined to the main body of said fixture by a pair of diagonally extending arms having longitudinally extending ribs, and a main body portion having an aperture for a securing bolt.

7. A pole guy fixture comprising a body having an integral yoke with a grooved cable engaging surface, said yoke being joined to the main body of said fixture by a pair of diagonally extending arms having longitudinally extending ribs, a main body portion having an aperture for a securing bolt, said arms having their widest dimension extending in the direction of said grooved surface, and ribs extending from said arms to said main body portion.

8. A pole guy fixture comprising a body having an integral yoke with a grooved cable engaging surface, said yoke being joined to the main body of said fixture by a pair of diagonally extending arms having longitudinally extending ribs, a main body portion having an aperture for a securing bolt, said arms having their widest dimension extending in the direction of said grooved surface, ribs extending from said arms to said main body portion, and an annular collar carried by said body surrounding said aperture.

9. A pole guy fixture for securing guys to poles or the like comprising a cast metal member formed with pole engaging flanges having apertures for securing means, transverse lugs extending from said pole engaging flanges, said transverse lugs being joined by a cable engaging portion forming a groove curved to engage the sides of a cable and laterally curved to prevent a sharp bend in said cable.

10. A pole guy fixture for securing guys to poles or the like comprising a cast metal member formed with pole engaging flanges having apertures for securing means, transverse lugs extending from said pole engaging flanges, said transverse lugs being joined by a cable engaging portion forming a groove curved to engage the sides of a cable and laterally curved to prevent a sharp bend in said cable, said apertures comprising elongated slots arranged transversely to each other for adjustment to register with holes bored in a pole or the like.

11. A pole guy fixture for securing diagonal guys to poles, comprising a cast metal member formed with a pole engaging flange, and a pair of laterally and downwardly extending lugs joined by a cable engaging portion, said lugs tapering toward said flange and said cable engaging portion having a surface curved to fit a cable and laterally curved to prevent a sharp bend in said cable.

12. A pole guy fixture for securing guys to poles or the like comprising a metal member formed with a pole engaging flange having means for securing the member to a pole or the like, and having a cable engaging portion which is laterally curved to prevent a sharp bend in a cable, said cable engaging portion being formed with a curved groove, the walls of said groove being adapted to support the sides of said cable to prevent flattening of the cable and the consequent unequal strain on various parts of the cable.

13. A pole guy fixture comprising a body formed with a pair of attaching flanges having apertures for securing bolts, a pair of transverse arms carried by said body, and a pair of diagonal arms carried by said body, and a yoke carried by each of said arms, said yokes each having a cable engaging surface.

14. A pole guy fixture comprising a body formed with a pair of attaching flanges having apertures for securing bolts, a pair of transverse arms carried by said body, and a pair of diagonal arms carried by said body, and a yoke carried by each of said arms, said yokes each having a cable engaging surface, with a cable groove extending in the direction of a cable secured to said fixture.

In witness whereof, I hereunto subscribe my name this 5 day of July, 1930.

ALBERT B. CHANCE.